United States Patent
Burns et al.

(10) Patent No.: US 7,014,685 B2
(45) Date of Patent: Mar. 21, 2006

(54) FILTER ELEMENT AND MOUNTING METHOD

(75) Inventors: David J. Burns, Mineral Wells, TX (US); John A. Krogue, Mineral Wells, TX (US); Tomas I. Borjon, Millsap, TX (US)

(73) Assignee: Perry Equipment Corp., Mineral Wells, TX (US)

( * ) Notice: Subject to any disclaimer, the term of this patent is extended or adjusted under 35 U.S.C. 154(b) by 62 days.

(21) Appl. No.: 10/775,892

(22) Filed: Feb. 10, 2004

(65) Prior Publication Data

US 2005/0172810 A1    Aug. 11, 2005

(51) Int. Cl.
*B01D 46/00*    (2006.01)

(52) U.S. Cl. .............. 95/273; 95/278; 55/356; 55/357; 55/379; 55/385.1; 55/482; 55/484; 55/490; 55/498; 55/502; 55/503; 55/520

(58) Field of Classification Search .......... 55/356, 55/357, 378, 379, 385.1, 482, 484, 490, 492, 55/495, 498, 502, 503, 508, 520, DIG. 26; 95/273, 278

See application file for complete search history.

(56) References Cited

U.S. PATENT DOCUMENTS

| | | | | |
|---|---|---|---|---|
| 2,992,814 A | | 7/1961 | Maher | 261/23 |
| 3,228,174 A | * | 1/1966 | Perry, Jr. | 55/484 |
| 3,349,547 A | | 10/1967 | Hoipkemeier | 55/324 |
| 3,594,992 A | * | 7/1971 | Carr et al. | 55/302 |
| 3,713,279 A | | 1/1973 | Moore | 55/319 |
| 3,793,812 A | | 2/1974 | Willis | 55/338 |
| 3,888,644 A | | 6/1975 | Holland et al. | 55/318 |
| 4,010,804 A | | 3/1977 | Garcia | 166/315 |
| 4,141,128 A | * | 2/1979 | Wonderling | 55/379 |
| 4,180,391 A | | 12/1979 | Perry, Jr. et al. | 55/324 |
| 4,253,856 A | * | 3/1981 | Paucha | 55/379 |
| 4,256,473 A | * | 3/1981 | De Martino | 55/505 |
| 4,257,790 A | * | 3/1981 | Bergquist et al. | 55/502 |
| 4,297,116 A | | 10/1981 | Cusick | 55/319 |
| 4,559,138 A | * | 12/1985 | Harms, II | 55/484 |
| 5,211,846 A | * | 5/1993 | Kott et al. | 55/498 |
| 5,327,975 A | | 7/1994 | Land | 166/369 |
| 5,435,915 A | * | 7/1995 | Connors, Jr. | 55/484 |
| 5,827,430 A | | 10/1998 | Perry, Jr. et al. | 201/497 |
| 5,833,853 A | * | 11/1998 | Carlson | 55/520 |
| 5,868,807 A | * | 2/1999 | Luy et al. | 55/508 |
| 5,919,284 A | * | 7/1999 | Perry et al. | 55/484 |
| 6,168,647 B1 | | 1/2001 | Perry, Jr. et al. | 95/19 |
| 6,440,188 B1 | * | 8/2002 | Clements et al. | 55/502 |

FOREIGN PATENT DOCUMENTS

DE    34 05 929 A1 *    6/1984

* cited by examiner

*Primary Examiner*—Jason M. Greene
(74) *Attorney, Agent, or Firm*—Charles D. Gunter, Jr.

(57) ABSTRACT

The present invention relates to an apparatus for filtering a gas or liquid stream such as a natural gas stream. The apparatus includes a closed vessel having a longitudinally extending length, an initially open interior, an input port at one extent and an output port at an opposite extent thereof. A partition located within the vessel interior divides the vessel interior into a first stage and a second stage. At least one opening is provided in the partition. A filter element is disposed within the vessel to extend from within the first stage. The filter element is easily mounted or removed from the vessel by rotating a J-slot engagement surface on the element which mates with a post provided on a mounting structure provided on the vessel partition.

16 Claims, 6 Drawing Sheets

FILTER ELEMENT AND MOUNTING METHOD

BACKGROUND ART

1. Field of the Invention

The invention relates to filter vessels used to filter gas and liquid streams such as natural gas and natural gas processing liquid streams and to filter elements for such vessels, and, more specifically, to an improved structure and method for mounting the filter elements within the interior of the associated filter vessel.

2. Description of Related Art

Gas filter elements for filtering dry gas streams as well as for separating solids and liquids from contaminated gas streams are well known, as are gas filter elements for coalescing entrained liquids from a gas stream. Often these types of gas filter elements are installed in multi-stage vessels, which are in turn installed in a gas pipeline, to perform these filtering functions. U.S. Pat. No.'s 5,919,284, issued Jul. 6, 1999, and U.S. Pat. No. 6,168,647, issued Jan. 2, 2001, both to Perry, Jr., and assigned to the assignee of the present invention, disclose multi-stage vessels using individual separator/coalescer filter elements to separate solids, filter liquids, and coalesce liquids. The foregoing multi-stage vessels, as well as a multitude of other similar filtration vessels used in industry utilize solid or hollow core tubular elements, typically formed at least party of a porous filtration media. For example, porous filtration elements useful in the above type of filtration vessels are of the same general type as those that are described in U.S. Pat. No. 5,827,430, issued Oct. 27, 1998 to Perry, Jr., et al., and assigned to the assignee of the present invention.

It is periodically necessary to perform maintenance on the filtration vessels, including replacement of the porous filter elements. This task has been labor intensive and time consuming in the past because of the mounting structure used to mount the filter elements within the filtration vessel interior. Often, it was necessary to unscrew and end cap or nut to free the filter element from its associated structural mounting within the vessel interior. Not only was this time consuming, but the location of the mounting structure was sometimes inconvenient to access, making filter replacement a difficult or inconvenient chore. The same type of inconveniences were present in the initial filter installation process for new filtration vessels.

Thus, despite various advances which have been made in overall filtration vessel design, there continues to be a need for improvements which simplify the process of mounting and replacing filter elements within the filtration vessel, thereby decreasing the cost of vessel installation and maintenance.

BRIEF SUMMARY OF THE INVENTION

An apparatus is shown for filtering a gas or liquid stream such as a natural gas stream or a natural gas processing liquid stream. The apparatus includes a closed vessel having a length and an initially open interior. A partition is disposed within the vessel interior. The partition has a planar inner and planar outer side, respectively, dividing the vessel interior into a first stage and a second stage. At least one opening is provided in the partition. An inlet port is provided in fluid communication with the first stage. An outlet port also provides fluid communication from the second stage. At least one tubular filter element is disposed within the vessel to sealingly extend within the first stage. Each filter element has a locking end, a tubular length and a handle end. A mounting structure is located on a selected planar side of the partition. Rotational mounting means are provided on the locking end of at least selected filter elements which means cooperate with the mounting structure of the vessel for rotationally locking the filter element with respect to the partition upon rotational movement of the filter element from the handle end.

Preferably, the locking end of the filter elements is a generally cylindrical surface which forms an end opening and the mounting means provided on the locking end of the filter elements is a slot provided in the cylindrical surface. The most preferred mounting means provided on the locking end of the filter element is a J-slot. The generally cylindrical locking end of the filter elements joins the tubular length of the filter elements at a neck region of each filter element. The neck region forms a region of increased external diameter along the tubular length of the filter element. A seal means is located at the neck region for sealing against the partition when the filter element is locked in a fully engaged position. The preferred seal means can comprise a chevron-shaped seal or an O-ring seal. The preferred mounting structure located on a selected side of the partition is a continuous post, or a pair of spaced post elements, aligned with respect to the partition opening, wherein the J-slot receives and engages the post or pair of post elements as the filter element is rotated from the handle end.

The filter elements each have a filter wall and can have hollow cores. The input port, vessel interior, tubular filter elements and output port together define a flow passage within the apparatus. The gas stream flows into the first stage through the input port and through the outer filter wall of the filter element and through the hollow filter core, thereby separating impurities out of the gas stream. The gas stream then flows out of the second stage through the outlet port. The preferred tubular filter elements consist of multi-overlapped layers of non-woven fabric strips.

A method is also shown for installing a filter element within a filtration vessel used to filter gas, liquid and gas/liquid streams. A filter vessel is provided as previously described having a first and second stage divided by a partition. At least one replaceable filter element is installed within the filter vessel. The filter element is provided with the previously described locking end, tubular length, and handle end. The filter element is installed within the vessel by rotationally locking the filter element with respect to the partition upon rotational movement of the filter element from the handle end.

The above as well as additional objects, features, and advantages of the invention will become apparent in the following detailed description.

DETAILED DESCRIPTION OF THE PREFERRED EMBODIMENT

Figure 1:
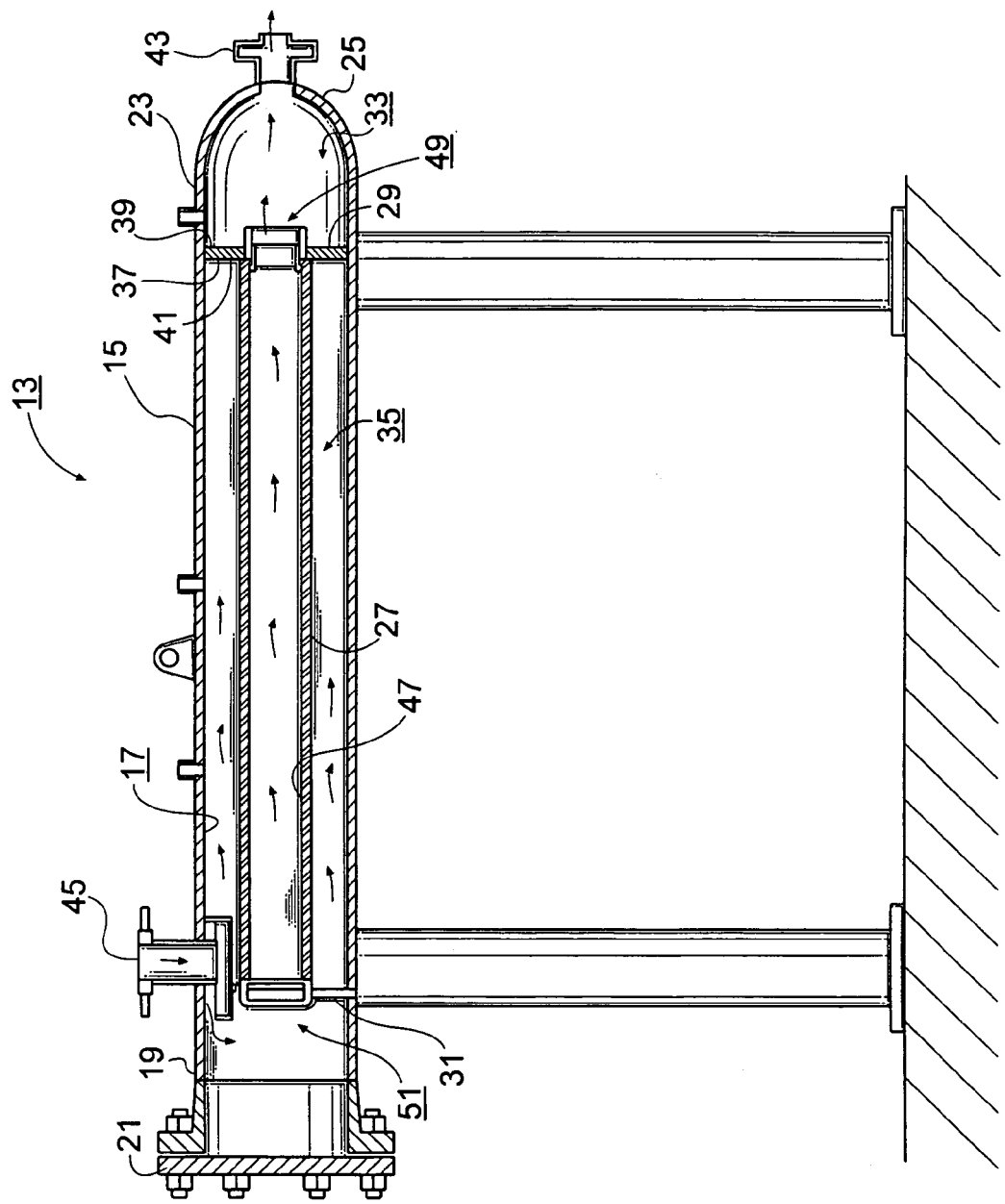
FIG. 1 is a side elevational view in partial section of a filter vessel having a filter element of the invention installed therein.

Turning to FIG. 1 there as shown a filter vessel of the invention designated generally as 13. The apparatus 13 is shown in its simplest form as a dry-gas filter. The internals or filter element shown in unit 13, illustrated in FIG. 1, would typically be followed by a second stage mist extractor of the type commercially available in the industry. While FIG. 1 illustrates one embodiment of a natural gas filtration vessel, it will be understood by those skilled in the art that the filter elements and method of mounting covered by the present invention can be applied to a variety of such vessels used in the industry. For example, the filter elements of the invention might be employed in vessels which are used for simultaneously filtering solids, separating liquids, pre-coalescing liquids, and coalescing liquids out of a gas stream. The filter elements might also be utilized in vessels used for coalescing and separating two liquids and for filtering solids out of liquids. Also, while the vessel shown in FIG. 1 illustrates one filter element mounted within the vessel for simplicity of illustration, it will be understood that some vessel designs will employ multiple elements utilizing the attachment means of the invention in a single vessel.

Referring again to FIG. 1, it should be understood that although the vessel 13 is shown in a generally horizontal configuration, it may also be configured in a generally vertical embodiment. The vessel 13 has a generally tubular shell 15 having an initially open interior 17. The shell 15 is enclosed at an inlet end 19 by means of a closure member 21 which, in this case, is a bolted flange. The shell 15 is permanently enclosed at an outlet end 23 by a cap 25, preferably elliptical. The flanged closure 21 provides a fluid tight seal with respect to the inlet end 19. In the embodiment of FIG. 1, a single filter element 27 is supported within the vessel open interior 17 by means of a vessel partition 29 and support element 31. The support element 31 can comprise a flat bar or expanded metal.

The partition 29 divides the hull interior into a first stage 35 and a second stage 33. The vessel 13 is preferably manufactured of steel materials which conform to published pressure-vessel standards, such as ASME Boiler and Pressure Vessel Code, Section VIII, Division 1.

The partition 29 which divides the vessel interior into the first and second filtration stages has a planar inner and planar outer opposing sides 37, 39, respectfully. At least one opening 41 is provided in the partition for receiving an end of the filter element. An inlet port 45 is in fluid communication with the first stage and an outlet port 43 is in communication with the second stage. The tubular filter element 27 is disposed within the vessel to sealingly extend within the first stage 35 through one of the openings 41 in the partition 29 into the second stage 33. Gas flow is through the inlet port 45, through the filter wall, of the filter element, through the hollow core 47 of the filter element, and through the second stage to the outlet 43. The direction of the gas flow is indicated by the arrows in FIG. 1.

Figure 3A:
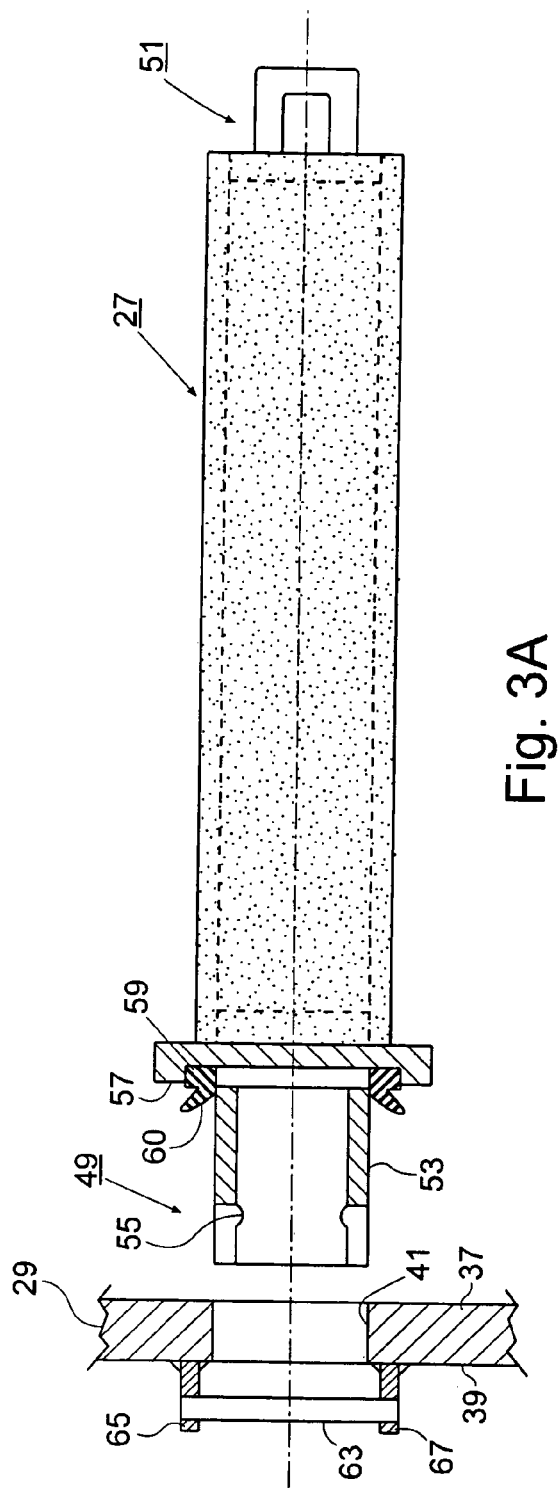
FIG. 3A is a side, sectional view of a filter element of the invention shown disengaged from the associated vessel mounting structure, the filter element having a chevron-shaped seal.
Figure 3B:
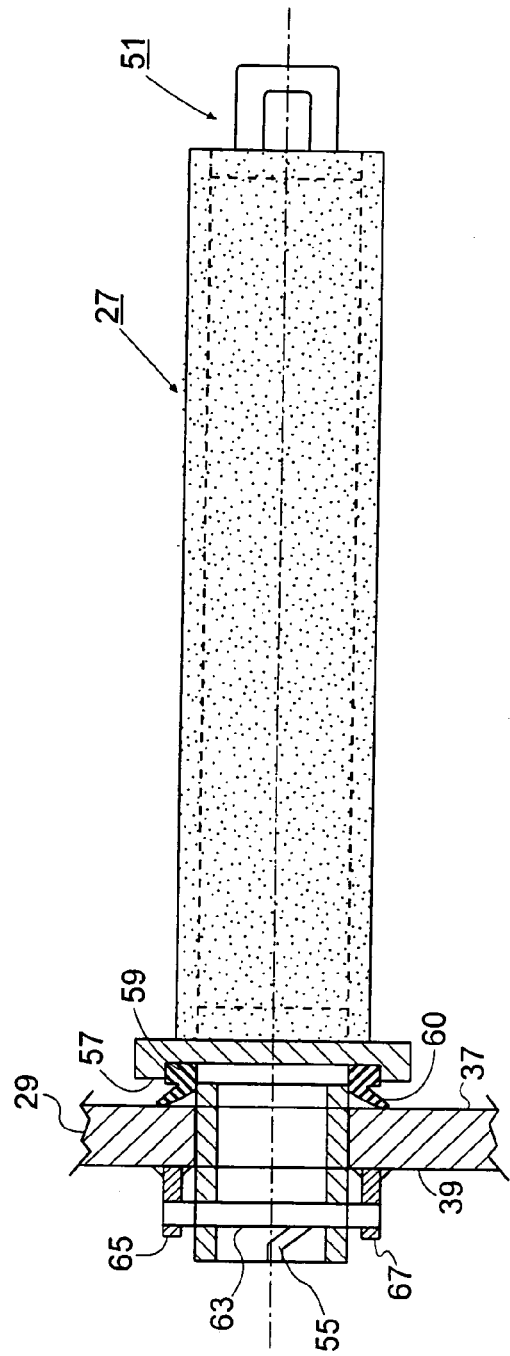
FIG. 3B is a view similar to FIG. 3A but with the filter element shown in the engaged position with respect to the vessel mounting structure.

As best seen in FIGS. 3A and 3B, each tubular filter element 27 has a locking end 49, a tubular length and a handle end 51. As shown in FIG. 3A, a mounting structure is located on a selected planar side of the partition 29. A rotational mounting means is provided on the locking end 49 of the filter element 27 which cooperates with the mounting structure of the vessel for rotationally locking the filter element with respect to the partition 29 upon rotational movement of the filter element 27 from the handle end 51.

Preferably, the filter element is provided with a generally cylindrical locking end 53 and the rotational mounting means on the locking end of the filter element is a slot 55 provided in the cylindrical surface of the locking end 53. The preferred mounting means on the locking end of the filter element is a J-slot, as illustrated in the drawings. The generally cylindrical locking end 53 of the filter element joins the tubular length of the filter element at a neck region 57. The neck region 57 forms a region of increased external diameter along the tubular length of the filter element. A seal means is located at the neck region for sealing against the partition 29 when the filter element 27 is locked in position. In the embodiment of the invention illustrated in FIGS. 3A and 3B, the seal means is an elastomeric chevron-shaped member 59. The chevron-shaped seal 59 is shown engaged against the partition planar inner side 37 in FIG. 3B. The exposed lip 60 of the seal member 59 acts as a resilient spring in holding the overall filter element in a "locked" or "seal engaged" position (illustrated in FIG. 3B).

Figure 4A:
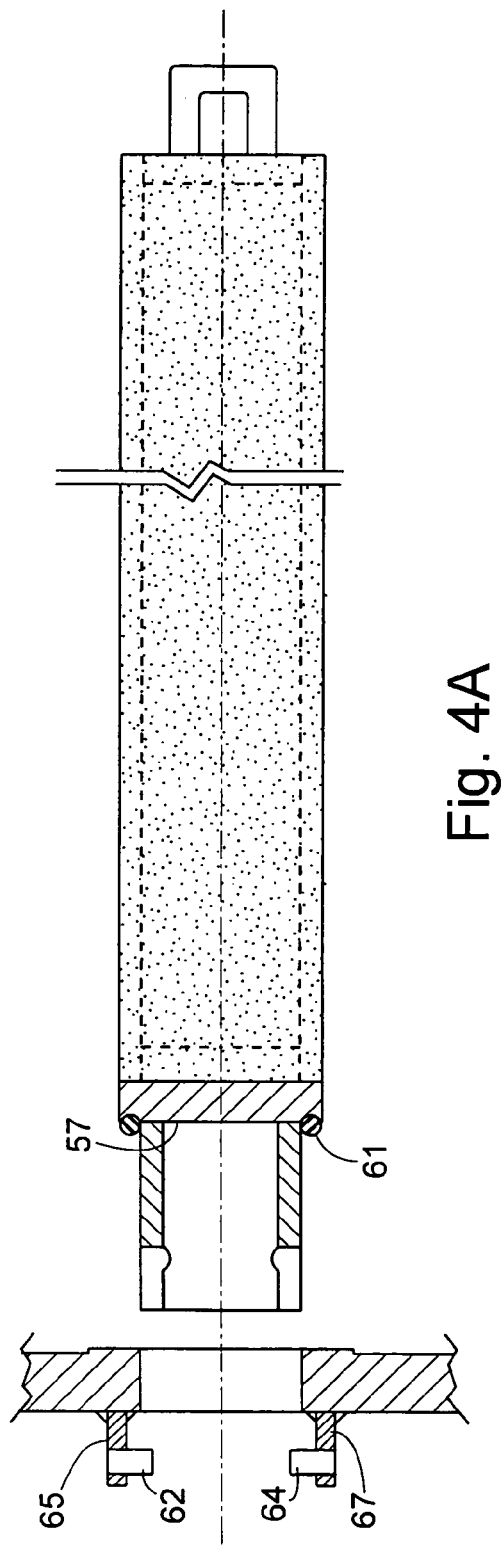
FIG. 4A is a view of an alternative filter element design showing an O-ring type seal for engaging the associated vessel mounting structure.
Figure 4B:
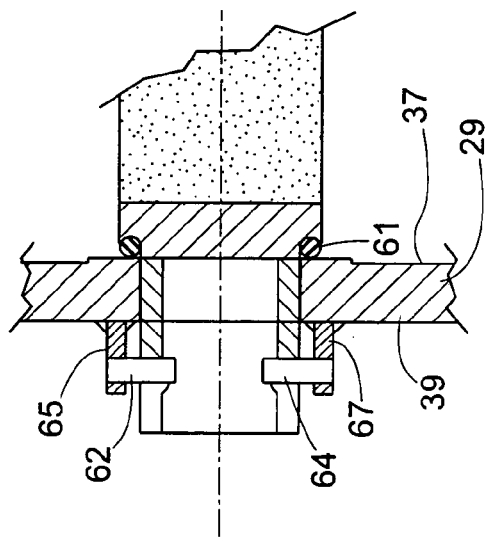
FIG. 4B is a view of the filter element of FIG. 4A engaged with the vessel mounting structure.

FIGS. 4A and 4B illustrate another embodiment of the filter element of the invention in which the neck region 57 carries an O-ring seal 61, the O-ring seal being received within a mating groove provided on the planar surface of the neck region. FIG. 4B shows the O-ring seal in engagement with the planar inner side 37 of the partition 29 when the element is in the locked in position.

As shown in FIG. 3A, the mounting means which is provided on the partition 29 can comprise a continuous post 63 which is aligned with respect to a partition opening 41. As shown in FIG. 3B, the J-slot 55 provided in the cylindrical end 53 of the filter element receives and engages the post 63 as the filter element is rotated from the handle end 51. The post 63 is, in this case, supported between opposing side flanges 65, 67 which are arranged to generally perpendicular to the planar face 39 of the partition 29. In this way, the post 63 extends in a plane generally parallel to the plane of the selected planar face of the partition.

As illustrated in FIGS. 4A and 4B, the mounting means which is provided on the partition 29 can also comprise two spaced-apart post elements 62, 64, with one post element being attached to each opposing side flange 65, 67. The discontinuity in the post 63 (shown in FIG. 3A) helps to reduce the flow restriction in the filter element outlet end caused by the presence of the mounting structure.

Figure 2A:
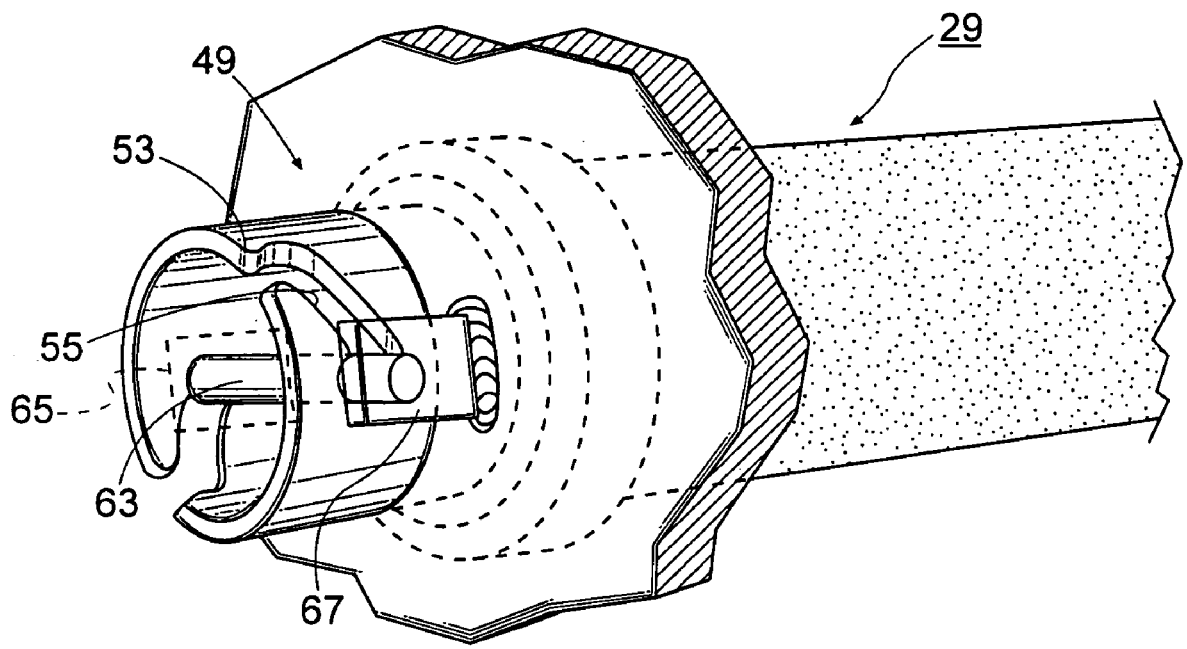
FIG. 2A is partial, end view of a filter element of the invention showing the element engaged within the vessel mounting structure.
Figure 2B:
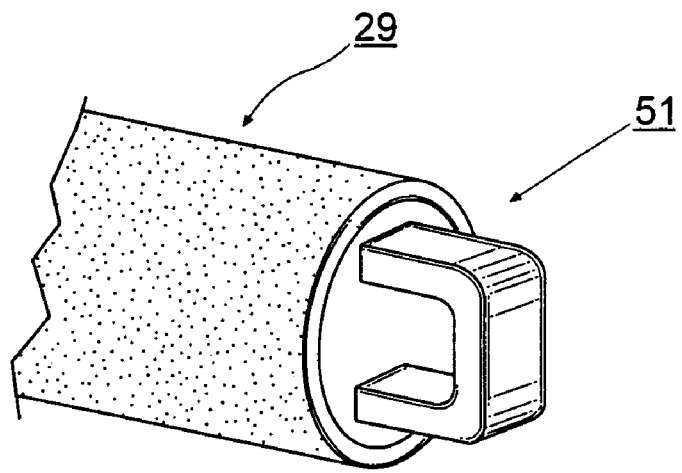
FIG. 2B is an isolated view of the handle end of the filter element of the invention.

FIGS. 2A and 2B illustrate the respective locking and handle ends of the filter element 27. FIG. 2A illustrates the rotational mounting means (J-slot 55) fully engaged with the mounting post 63. In this case, the post 63 is a continuous post which is supported between the opposing side flanges 65, 67, as described with respect to FIGS. 3A and 3B.

The filter elements of the invention can be easily installed or removed from within the filter vessel 13. As shown in FIG. 1, the initially open interior 17 can be accessed by means of the closure 21. The filter element 27 can removed by simply turning the handle end 51. Rotational movement of the handle 51 causes the locking end 49 to rotate, whereby the J-slot rides about the post 63 (FIG. 2A), thereby releasing the element. The element can then be withdrawn from the vessel interior 17 by sliding the element longitudinally along the horizontal axis of the vessel and out the closure opening. A replacement filter element can then be easily installed by repeating the above steps in the reverse order.

Figure 6:
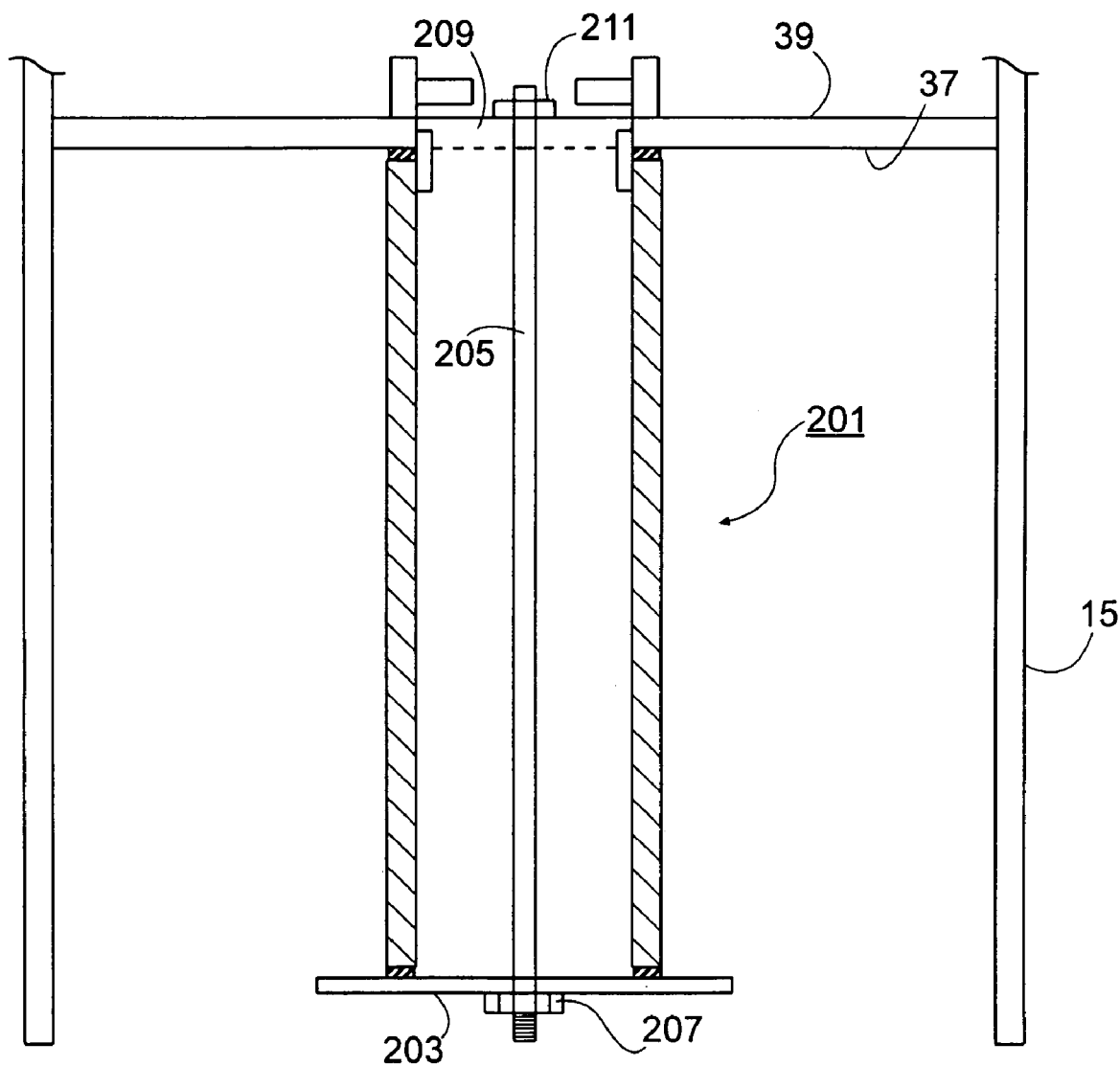
FIG. 6 is a simplified, side view of a conventional filter element which is used in retrofit fashion within the filter vessel of the invention.

The filter vessel 13 can also be retrofitted with an existing, conventional filter element, such as the element 201 shown in FIG. 6. In the example illustrated, a single or double open end filter element 201 is provided with a sealing plate 203 at one extent. An element attachment rod 205 is secured to the sealing plate 203 by means of external nut 207 on one end and is supported within an opening 209 in the partition or tubesheet (29 in FIG. 1) by means of a flat bar 211 which fits across the tubesheet opening.

It will be understood by one skilled in the art that other mounting means could also be utilized to mount a conventional filter element within the vessel of the invention. For example, the element attachment rod (205 in FIG. 6) could carry a transverse pipe in place of the flat bar 211 which pipe would have end openings which could be received over the spaced-apart posts (62 and 64 in FIG. 4A). Other types of engagement means could also be carried on the element attachment rod 205.

The bodies, or tubular filter walls of the filter elements of the invention are preferably constructed in the manner and of the materials disclosed in U.S. Pat. No. 5,827,430, issued Oct. 27, 1998 to Perry, Jr., et al. A suitable filter element for use in the present invention is the PEACH™ filter commercially available from Perry Equipment Corporation of Mineral Wells, Texas. For example, in a typical application, the filter elements consist of four multi-overlapped layers of non-woven fabric strips of varying composition. The first layer is composed of equal amounts by volume of fibers purchased from Hoechst Celanese of Charlotte, N.C., United States, sold under the fiber designation "252," "271," and "224," has a basis weight of 0.576 ounces per square foot, is ten inches wide, and is overlapped upon itself five times. The denier of fiber "252" is 3 and its length is 1.500 inches. The denier of fiber "271" is 15 and its length is 3.000 inches. The denier of fiber "224" is 6 and its length is 2.000 inches.

The second layer is composed of equal amounts by volume of "252," "271," and "224," has a basis weight of 0.576 ounces per square foot, is eight inches wide, and is overlapped upon itself four times. The third layer is composed of equal amounts by volume of "252," "271," and "224," has a basis weight of 0.576 ounces per square foot, is eight inches wide, and is overlapped upon itself four times. The fourth layer is composed of equal amounts by volume of "252" and a fiber sold under the name "Tairilin," has a basis weight of 0.576 ounces per square foot, is six inches wide, and is overlapped upon itself three times. Fiber "252" being of the core and shell type serves as the binder fiber in each of the aforementioned blends.

The above example of particular types of material, fabric denier, number of wrapping layers, etc., is intended to be illustrative only of the type of preferred filter materials useful in the practice of the present invention. The rotational lock and release feature of the elements of the invention could be used with conventional filter materials, as well.

Figure 5:
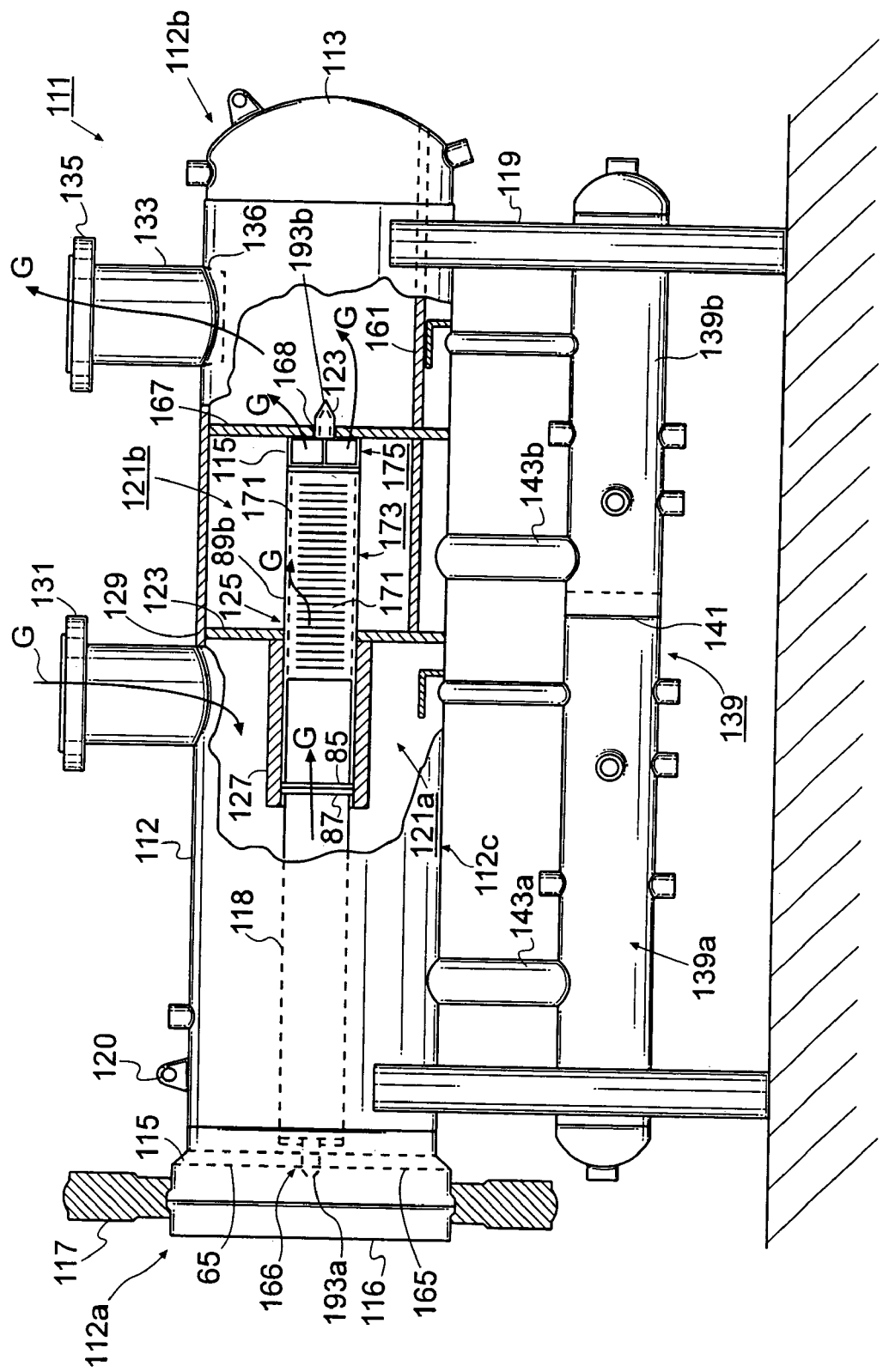
FIG. 5 is a view of a prior art filtration vessel showing the method of mounting the filter elements therein.

The advantages of the improved filter elements and method of mounting thereof can perhaps best be understood with reference to the prior art filtration unit shown in FIG. 5 of the drawings. This vessel is described in issued U.S. Pat. No. 6,168,647, issued Jan. 2, 2001, and assigned to the assignee of the present invention. The discussion which follows also describes the filtration process in greater detail. The vessel 111, shown in FIG. 5, is best suited for mist collection. In addition, multi-stage vessel 111 is well suited for applications involving immiscible fluids, and as such, can be used in applications requiring the separation and filtration of two immiscible liquids or immiscible liquids and gases. The flow of the gas stream is indicated below as arrow G. Multi-stage vessel 111 has a generally tubular hull 112 having an initially open interior. Hull 112 is releasably enclosed on an upper inlet end 112a by a conventional closure member 115, preferably a quick-opening closure. Hull 112 is permanently enclosed on a lower outlet end 112b by a cap 113, preferably elliptical. Closure member 115 consists of a conventional head member 116 and a conventional clamping member 117. Head member 116 is releasably sealed to multi-stage vessel 111 by clamping member 117. Clamping member 117 may be released, and head member 116 may be opened to allow access to the interior of hull 112. Clamping member 117 provides a fluid-tight seal between hull 112 and head member 116, preferably with a conventional O-ring (not shown). A plurality of separator/coalescer filter elements 118 are disposed within hull 112. Separator/coalescer filter elements 118 are constructed as described above with respect to the vessel of the invention. Hull 112 is supported by support members 119. A conventional davit assembly supports head 116 when head 116 so that head 116 may be swung open to allow access to multi-stage vessel 111.

The interior of hull 112 is divided into a first stage 121a and a second stage 121b by a generally transverse partition 123. Partition 123 includes a plurality of openings 125. A tubular filter guide 127 is aligned with each opening 125. Each filter guide 127 extends longitudinally a selected distance from partition 123 into first stage 121a. An inlet port 129 is disposed on hull 112 and opens into first stage 121a. Inlet port 129 terminates with an inlet flange 131. Inlet port 129 is located near partition 123 so that as a gas stream flows through the inlet port 129 into first stage 121a, the gas stream impinges upon filter guides 127. An outlet port 133 is disposed on hull 112 and opens into second stage 121b. Outlet port 133 terminates with an outlet flange 135. Outlet flange 135 is adapted to allow multi-stage vessel 111 to be connected to a conventional gas pipeline. An annular collar 136 is aligned with outlet port 133 and extends into second stage 121b.

Disposed underneath portion 112c of hull 112 is a sump 139 for collecting the filtered solids, the separated liquids, the pre-coalesced liquids, and the coalesced liquids, that are removed from the gas stream. Sump 139 is divided into a first stage sump 139a and a second stage sump 139b by an impermeable sump partition 141. A first stage downcomer 143a provides fluid communication between first stage 121a and first stage sump 139a. The second stage downcomer 143b similarly provides fluid communication between second stage 121b and second stage sump 139b. A screen member 161 in the lower portion of the second stage 121b acts as a barrier to prevent coalesced liquids that have collected in the lower portion of the second stage from being re-entrained in the gas stream.

A plurality of first stage support straps 165 are disposed in first stage 121a to support separator/coalescer filter elements 118. First stage support straps 165 generally extend transversely across first stage 121a and are connected to the interior of hull 112 by a snap fit or any suitable holding clip member. First stage support straps 165 include a plurality of apertures 166 to receive separator/coalescer filter elements 118 firmly in place without longitudinal compression. Likewise, a plurality of second stage support straps 167 are disposed in second stage 121b to support separator/coalescer filter elements 118. Second stage support straps 167 generally extend transversely across second stage 121b and are connected to the interior of hull 112. Second stage support straps 167 include a plurality of apertures 168 to receive separator/coalescer filter elements 118. The filter elements include filter cap posts 193a and 193b.

A plurality of louvered impingement baffles 171 are disposed in second stage 121b to prevent coalesced liquids and fine liquids from becoming re-entrained in the gas stream as the gas stream flows through second stage 121b toward outlet port 133. A separate louvered impingement baffle 171 is associated with each separator/coalescer filter element 118 and each corresponding opening 125 in partition 123. Each louvered impingement baffle 171 includes a basket body portion 173 coupled to a basket cap portion 175. Each louvered impingement baffle 171 includes a plurality of annular louvers 177 disposed along the extent of basket body portion 173.

It will be appreciated from the foregoing discussion that a more complicated mounting and support structure are required in the prior art device. The improved filter element and mounting method of the invention provides several advantages over such a structure. The improved filter elements of the invention utilize a rotational locking feature which allows the filter element to be easily installed or removed from the filter vessel interior. The simplicity of the J-slot locking mechanism simplifies the design of the element and associated mounting structure and provides improved efficiency during installation and maintenance operations. The filter locking design is simple in design and economical to manufacture. The locking mechanism is extremely reliable in operation.

While the invention is shown in only one of its forms, it is not just limited but is susceptible to various changes and modifications without departing from the spirit thereof.

We claim:

1. An apparatus for filtering a natural gas stream, the apparatus comprising:
    a closed vessel having a length and an initially open interior;
    a partition disposed within the vessel interior, the partition having a planar inner and planar outer side, respectively, dividing the vessel interior into a first stage and a second stage;
    at least one opening in the partition;
    an inlet port in fluid communication with the first stage;
    an outlet port in fluid communication with the second stage;
    at least one tubular filter element, the tubular filter element being disposed within the vessel to sealingly extend from within the first stage, the filter element having a locking end, a tubular length, and a handle end;
    a mounting structure located on a selected planar side of the partition;
    a rotational mounting means on the locking end of the at least one filter element which cooperates with the mounting structure of the vessel for rotationally locking the filter element with respect to the partition upon rotational movement of the filter element from the handle end; and
    wherein the generally cylindrical locking end of the filter elements joins the tubular length of the filter elements at a neck region of each filter element, the neck region forming a region of increased external diameter along the tubular length of the filter element, and wherein a seal means is located at the neck region for sealing against the partition when the filter element is locked in position.

2. The apparatus of claim 1, wherein the seal means is a chevron-shaped seal.

3. The apparatus of claim 1, wherein the seal means is an O-ring seal.

4. An apparatus for filtering a natural gas stream, the apparatus comprising:
    a closed vessel having a length and an initially open interior;
    a partition disposed within the vessel interior, the partition having a planar inner and planar outer side, respectively, dividing the vessel interior into a first stage and a second stage;
    at least one opening in the partition;
    an inlet port in fluid communication with the first stage;
    an outlet port in fluid communication with the second stage;
    at least one tubular filter element, the tubular filter element being disposed within the vessel to sealingly extend from within the first stage, the filter element having a locking end, a tubular length, and a handle end;
    a mounting structure located on a selected planar side of the partition;
    a rotational mounting means on the locking end of the at least one filter element which cooperates with the mounting structure of the vessel for rotationally locking the filter element with respect to the partition upon rotational movement of the filter element from the handle end;
    wherein each of the filter elements has a generally cylindrical locking end and wherein the mounting means on the locking end of the filter elements is a slot provided in the cylindrical locking end;
    wherein the mounting means on the locking end of the filter elements is a J-slot;
    wherein the mounting structure located on a selected side of the partition is a post which is aligned with respect to a partition opening and wherein the J-slot receives and engages the post as the filter element is rotated from the handle end; and
    wherein the post is supported between opposing side flanges, the side flanges being arranged generally perpendicular to the selected planar face of the partition, whereby the post extends in a plane generally parallel to the plane of the selected planar face of the partition.

5. An apparatus for filtering a natural gas stream, the apparatus comprising:
    a closed vessel having a length and an initially open interior;
    a partition disposed within the vessel interior, the partition having a planar inner and planar outer side, respectively, dividing the vessel interior into a first stage and a second stage;
    at least one opening in the partition;
    an inlet port in fluid communication with the first stage;
    an outlet port in fluid communication with the second stage;
    at least one tubular filter element, the tubular filter element being disposed within the vessel to sealingly extend from within the first stage, the filter element having a locking end, a tubular length, and a handle end;

a mounting structure located on a selected planar side of the partition;

a rotational mounting means on the locking end of the at least one filter element which cooperates with the mounting structure of the vessel for rotationally locking the filter element with respect to the partition upon rotational movement of the filter element from the handle end;

wherein each of the filter elements has a generally cylindrical locking end and wherein the mounting means on the locking end of the filter elements is a slot provided in the cylindrical locking end;

wherein the mounting means on the locking end of the filter elements is a J-slot;

wherein the mounting structure located on a selected side of the partition is a pair of spaced apart post elements which are aligned with respect to a partition opening and wherein the J-slot receives and engages the post elements as the filter element is rotated from the handle end; and wherein the post elements are supported between opposing side flanges, the side flanges being arranged generally perpendicular to the selected planar face of the partition, whereby the spaced apart post elements extend in a plane generally parallel to the plane of the selected planar face of the partition.

6. A tubular filter element for filtering a natural gas stream passing through a filter vessel, the filter element comprising:

a body having a locking end, a tubular length and a handle end;

the tubular length of the filter body comprising a filter wall having a plurality of overlapped layers of nonwoven fabric strips, the filter body also having a hollow core;

a rotational mounting means on the locking end of the filter element which cooperates with a mating mounting structure provided within the filter vessel for rotationally locking the filter element with respect to the mounting structure upon rotational movement of the filter element from the handle end;

wherein the locking end of the filter element is a generally cylindrical locking end and wherein the mounting means on the locking end of the filter element is a slot provided in the cylindrical locking end; and wherein the generally cylindrical locking end of the filter element joins the tubular length of the filter element at a neck region of each filter element, the neck region forming a region of increased external diameter along the tubular length of the filter element, and wherein a seal means is located at the neck region for sealing against the mounting structure when the filter element is locked in position.

7. The filter element of claim 6, wherein the seal means is a chevron-shaped seal.

8. The filter element of claim 6, wherein the seal means is an O-ring seal.

9. A method of filtering solids from a natural gas stream, the method comprising the steps of:

providing a filter vessel having a first stage and a second stage, the first stage being separated from the second stage by a partition having at least one opening;

installing at least one replaceable filter element within the filter vessel, the filter element being sealed within the opening in the partition, the filter element having a locking end, a tubular length, and a handle end;

providing a mounting structure located on a selected planar side of the partition;

providing a rotational mounting means on the locking end of at least selected filter elements which cooperates with the mounting structure of the vessel for rotationally locking the filter element with respect to the mounting structure upon rotational movement of the filter element from the handle end;

filtering solids from the gas stream in the first stage; and passing the gas stream from the filter element to the second stage;

wherein the filter elements are provided with generally cylindrical locking ends and wherein the mounting means on the locking end of the filter elements is a slot provided in the cylindrical locking end; and wherein the generally cylindrical locking end of the filter elements join the tubular length of the filter elements at a neck region of each filter element, the neck region forming a region of increased external diameter along the tubular length of the filter element, and wherein a seal means is located at the neck region for sealing against the partition when the filter element is locked in position.

10. The method of claim 9, wherein the seal means is a chevron-shaped seal.

11. The method of claim 9, wherein the seal means is an O-ring seal.

12. An apparatus for filtering a natural gas stream, the apparatus comprising:

a closed vessel having a length and an initially open interior;

a partition disposed within the vessel interior, the partition having a planar inner and planar outer side, respectively, dividing the vessel interior into a first stage and a second stage;

an inlet port in fluid communication with the first stage;

an outlet port in fluid communication with the second stage;

at least one opening in the partition sized to receive a locking end of a tubular filter element for supporting the filter element within the vessel;

a mounting structure located on a selected planar side of the partition, the mounting structure comprising at least one post supported by side flanges so that the post lies in a plane which extends at least partly across the opening in the partition; and wherein the post is supported between opposing side flanges, the side flanges being arranged generally perpendicular to the selected planar face of the partition, whereby the post extends in a plane generally parallel to the plane of the selected planar face of the partition.

13. An apparatus for filtering a natural gas stream, the apparatus comprising:

a closed vessel having a length and an initially open interior;

a partition disposed within the vessel interior, the partition having a planar inner and planar outer side, respectively, dividing the vessel interior into a first stage and a second stage;

an inlet port in fluid communication with the first stage;

an outlet port in fluid communication with the second stage;

at least one opening in the partition sized to receive a locking end of a tubular filter element for supporting the filter element within the vessel;

a mounting structure located on a selected planar side of the partition, the mounting structure comprising at least one post supported by side flanges so that the post lies in a plane which extends at least partly across the opening in the partition;

wherein the mounting structure located on a selected side of the partition is a pair of spaced apart post elements which are aligned with respect to a partition opening; and wherein the post elements are supported between opposing side flanges, the side flanges being arranged generally perpendicular to the selected planar face of the partition, whereby the spaced apart post elements extend in a plane generally parallel to the plane of the selected planar face of the partition.

14. An apparatus for filtering a natural gas stream, the apparatus comprising:

a closed vessel having a length and an initially open interior;

a partition disposed within the vessel interior, the partition having a planar inner and planar outer side, respectively, dividing the vessel interior into a first stage and a second stage;

an inlet port in fluid communication with the first stage;

an outlet port in fluid communication with the second stage;

at least one opening in the partition sized to receive a locking end of a tubular filter element for supporting the filter element within the vessel;

a mounting structure located on a selected planar side of the partition, the mounting structure comprising at least one post supported by side flanges so that the post lies in a plane which extends at least partly across the opening in the partition; and wherein a filter element is retrofitted to be installed within the apparatus, the filter element carrying mounting means for engaging the partition opening of the apparatus.

15. The apparatus of claim 14, wherein the mounting means is an element attachment rod which is carried by the conventional filter element.

16. The apparatus of claim 15, wherein the element attachment rod has an engagement end which engages the at least one post supported by the side flanges of the mounting structure of the apparatus.

* * * * *